(12) United States Patent
Marcher et al.

(10) Patent No.: US 12,611,837 B2
(45) Date of Patent: Apr. 28, 2026

(54) TUBULAR FILM FOR STRETCH HOODS COMPRISING RECYCLED MATERIAL

(71) Applicant: Trioworld Nyborg A/S, Nyborg (DK)

(72) Inventors: Bjørn Marcher, Greve (DK); Jan Teglgaard Christiansen, Svendborg (DK)

(73) Assignee: Trioworld Nyborg A/S, Nyborg (DK)

( * ) Notice: Subject to any disclaimer, the term of this patent is extended or adjusted under 35 U.S.C. 154(b) by 368 days.

(21) Appl. No.: 18/003,078

(22) PCT Filed: Jun. 22, 2021

(86) PCT No.: PCT/EP2021/066947
§ 371 (c)(1),
(2) Date: Dec. 22, 2022

(87) PCT Pub. No.: WO2021/259910
PCT Pub. Date: Dec. 30, 2021

(65) Prior Publication Data
US 2023/0264449 A1 Aug. 24, 2023

(30) Foreign Application Priority Data

Jun. 24, 2020 (EP) .................................... 20181997

(51) Int. Cl.
B32B 1/08 (2006.01)
B29C 48/00 (2019.01)
(Continued)

(52) U.S. Cl.
CPC ................ B32B 1/08 (2013.01); B32B 27/08 (2013.01); B32B 27/302 (2013.01);
(Continued)

(58) Field of Classification Search
None
See application file for complete search history.

(56) References Cited

U.S. PATENT DOCUMENTS 5,073,598 A 12/1991 Anzini
5,116,677 A 5/1992 Jones
(Continued)

FOREIGN PATENT DOCUMENTS

AU 702 657 B2 2/1999
CN 103613833 A * 3/2014 ............. B32B 27/08
(Continued)

OTHER PUBLICATIONS

Dow, "Design for Recyclability," <https://www.dow.com/content/dam/dcc/documents/en-us/mark-prod-info/768/768-39101-01-design-for-recyclability-overview.pdf>, Jun. 2019, 8 pages.
(Continued)

*Primary Examiner* — Thomas J Kessler
(74) *Attorney, Agent, or Firm* — CHRISTENSEN O'CONNOR JOHNSON KINDNESS PLLC

(57) ABSTRACT

The present invention relates to a tubular film intended to form a stretch hood. The tubular film has a core layer and at least one skin layer. The core layer comprises, by weight of the core layer: 30-80% of recycled polyethylene; 10-35% of a polymer booster selected from a thermoplastic elastomer and a polyolefin plastomer; and 0-40% of virgin ethylene polymer and/or virgin ethylene based copolymer.

16 Claims, 2 Drawing Sheets

Figure 1:
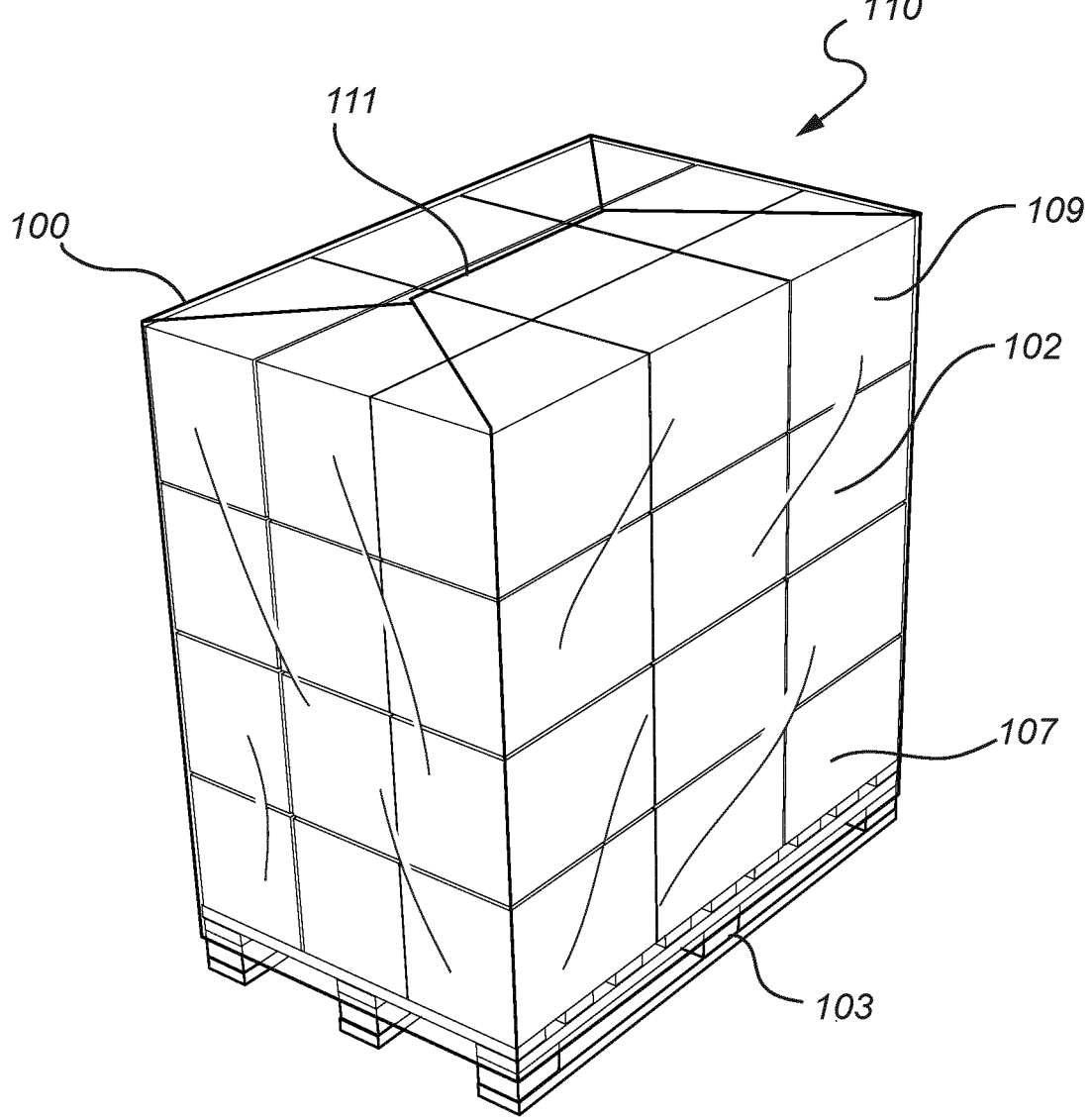

(51) Int. Cl.

| | |
|---|---|
| *B29C 48/21* | (2019.01) |
| *B29K 21/00* | (2006.01) |
| *B29K 23/00* | (2006.01) |
| *B29K 105/26* | (2006.01) |
| *B32B 27/08* | (2006.01) |
| *B32B 27/30* | (2006.01) |
| *B32B 27/32* | (2006.01) |
| *B65B 11/02* | (2006.01) |
| *B65D 75/00* | (2006.01) |

(52) U.S. Cl.
CPC ............ *B32B 27/306* (2013.01); *B32B 27/32* (2013.01); *B65B 11/02* (2013.01); *B65D 75/006* (2013.01); *B29C 48/0018* (2019.02); *B29C 48/21* (2019.02); *B29K 2021/003* (2013.01); *B29K 2023/06* (2013.01); *B29K 2023/083* (2013.01); *B29K 2105/26* (2013.01); *B32B 2250/242* (2013.01); *B32B 2250/40* (2013.01); *B32B 2270/00* (2013.01); *B32B 2272/00* (2013.01); *B32B 2274/00* (2013.01); *B32B 2553/00* (2013.01)

(56) References Cited

U.S. PATENT DOCUMENTS

| | | | |
|---|---|---|---|
| 5,432,231 A | 7/1995 | Su | |
| 5,972,443 A * | 10/1999 | Breck ................. | C08L 23/0815 156/203 |
| 9,670,344 B2 | 6/2017 | Favis et al. | |
| 2018/0362233 A1* | 12/2018 | Christensen ......... | B65D 71/066 |

FOREIGN PATENT DOCUMENTS

| | | | | | |
|---|---|---|---|---|---|
| EP | 3009263 A1 * | 4/2016 | ............. | A01F 25/13 |
| EP | 3 184 458 A1 | 6/2017 | | |
| EP | 3 483 206 A1 | 5/2019 | | |
| EP | 3 027 681 B1 | 7/2019 | | |
| WO | 95/21743 A1 | 8/1995 | | |
| WO | 2013075241 A1 | 5/2013 | | |
| WO | 2015015427 A1 | 2/2015 | | |
| WO | 2019091887 A1 | 5/2019 | | |
| WO | WO-2019240899 A1 * | 12/2019 | ............. | C08L 23/04 |

OTHER PUBLICATIONS

Exxonmobil, "Accommodating Challenges of Mechanically Recycling Immiscible Materials: Trial Results," c 2019, 16 pages.

"ExxonMobil introduces Rethink Recycle with Vistamaxx performance polymers," <https://recyclingportal.eu/Archive/51460> [retrieved Jan. 21, 2020], Oct. 10, 2019, 3 pages.

Exxonmobil Chemical, "Enhanced Shopper and Garbage Bag Film at Lower Costs," Apr. 2012, 2 pages.

Exxonmobil Chemical, "Vistamaxx™ PBE for Enhanced Toughness in HDPE Shoppers and Garbage Bags," © 2012, 15 pages.

Trioplast, "Trioloop Stretch Hood: The First Stretch Hood Containing Recycled Material," Powerpoint presentation, Nov. 2019, 9 pages.

International Search Report and Written Opinion mailed Aug. 27, 2021, issued in corresponding International Patent Application No. PCT/EP2021/066947, filed Jun. 22, 2021, 13 pages.

* cited by examiner

TUBULAR FILM FOR STRETCH HOODS COMPRISING RECYCLED MATERIAL

TECHNICAL FIELD

The present invention relates to a tubular film for a stretch hood; a method for forming a tubular film for a stretch hood; and a method for enclosing articles stacked on a pallet with the tubular film forming a stretch hood.

BACKGROUND

Large numbers of articles are collected and transported on pallets today. The articles are commonly stacked in layers on the pallets in order to minimize the amount of dead cargo space during transport. These stacks of articles are often wrapped in a polymer film to protect and keep the articles in place during transport. Commonly, stretch hoods are used to wrap the articles on the pallet. Stretch hoods are made from a continuous roll of gusseted tubular film which is stretched over the pallet load and at least part of the pallet, to keep the articles in place on the pallet. The gusseted film is typically made up of three layers: one core layer and two skin layers. To form a stretch hood, the skin layers are welded at the top just prior to application on a stack of articles. The stretch hood is then pre-stretched horizontally, drawn down vertically over the articles and released. Upon release, the stretch hood contracts around the articles to be packed and applies a holding force thereon.

The film of the stretch hood is typically made from ethylene based polymers. The core layer is typically made of ethylene-based copolymers, such as very low density polyethylene (VLDPE), ethylene-vinyl acetate copolymers (EVA) or ethylene butyl acrylate copolymers (EBA). The skin layers are typically made of metallocene-based Linear Low Density polyethylene (mLLDPE). In general, stretch hoods mainly consists of virgin polymers using fossil materials as raw materials.

Today, climate change has started a move towards a more circular economy in the polymer industry. The EU Commission has put up a pledge of million tons of recycled plastic in new products by 2025, which is expected to set a requirement of a minimum of 30% recycled content in most packaging products.

Attempts have therefore been made to replace some of the virgin polyethylene in stretch hoods by recycled polyethylene, such as post consumer recycled material (PCR), post-industrial recycled material (PIR), and internal production-waste recycled material (IPR). However, such attempts have typically yielded stretch hoods exhibiting inferior mechanical properties, such as inferior tear resistance, crack propagation resistance, elastic recovery, holding force and/or elongation at break. These properties tend to vary in the film, so some hoods may be fully or partly acceptable, whereas others with the same material composition may be unacceptable and defective at application of the stretch hoods. However, since each defective stretch hood causes a machine stop in the assembly line, such films may be considered unreliable by the end-users.

Therefore, there exists a need for improved, more sustainable pallet packaging solutions.

SUMMARY

It is an object of the present invention to address at least some of the deficiencies associated with prior art stretch hoods. In particular, it is an object to provide a tubular film intended for a stretch hood comprising a significant amount of recycled material. A stretch hood formed from the tubular film should exhibit a stretchability that is at least comparable to conventional stretch hoods. These and other objects, which are apparent to a person skilled in the art having studied the description below and the appended claims, are accomplished by a tubular film adapted to form a stretch hood, the tubular film having a core layer and at least one skin layer, wherein the core layer comprises, by weight of the core layer:

30-80% of recycled polyethylene;

10-35% of a polymer booster selected from a thermoplastic elastomer and a polyolefin plastomer; and 0-40% of virgin ethylene polymer and/or virgin ethylene based copolymer.

The inventors have surprisingly realized that by providing a polymer booster to the core layer of the tubular film, a sustainable tubular film that can be utilized as a stretch hood that can be pre-stretched to at least 50% without exhibiting any tears or other defects, can be achieved. The booster polymer is a polymer elastomer and/or a polymer plastomer, preferably a thermoplastic elastomer and/or a polyolefin elastomer. The addition of a booster polymer to the core layer of the film, in an amount of 10-35% by weight of the film, has proven to allow an addition of up to 80% of recycled polyethylene material in the core layer of the film without compromising the stretchability of a stretch hood formed from the film. Stretch hoods formed from the film disclosed herein has proven to be capable of being pre-stretched to at least 50% elongation without forming any tears or other defects in the stretch hood.

A "stretch hood" has the purpose of protecting a stack of articles and keeping the articles in place during transport. The stretch hood preferably covers the top and sides of the stack of articles. It may also cover at least a part of a pallet, upon which the articles are stacked. The stretch hood is made from a polymer film which is preferably tough to avoid puncturing during its service life, and in addition to secure load stability during transportation. The polymer film stretch hood preferably protects the stack of articles from rain, dust, and dirt, and may also serve to prevent vermin, such as rodents or insects, from entering the stack. The stretch hood may be UV-stable and should preferably preserve its mechanical features in a temperature range of from −20 to +50 degrees Celsius.

The tubular film of the present invention is configured to be applied as stretch hood on a stack of articles stacked on a pallet. Application is typically performed by automatic packaging machinery means, for industrial packaging of a large number of palletized stacks. Before application of the tubular film to the stack of articles, a sufficient length of tubular film is cut and welded at the top, thereby forming a stretch hood having a top and four sides. The stretch hood is then adapted to enclose the top and sides of a stack of articles.

Herein, the term "tubular film" refers to a film which has the shape of a tube. Consequently, each layer in the film also has the shape of a tube. The tubular film may be gusseted and provided on a roll for storage. A layered tubular film can be obtained by blown coextrusion.

The term "pre-stretch" is defined with reference to the following example method for applying a stretch hood to a stack of articles. During application of a stretch hood on stack of articles, a gusseted tubular film is typically provided on a roll. The opposing sides of the gusseted film are the welded together and the film is cut along the weld to form a stretch hood that comprises a top portion and four side walls capable of enclosing the articles on the pallet. Before application of the stretch hood to the stack of articles, the stretch-hood is pre-stretched in the normal direction of the outer sides of the four walls. The degree of elongation of the walls during the pre-stretch is typically at least 50%. This is the degree of "pre-stretch". The film is preferably pre-stretched to dimension that is slightly larger than the dimensions of the stacks of articles, to allow space for a pull-down device to run along the sides of the stack when pulling the film over the stack. The stretch hood is then pulled down using a pull-down device over the top and sides of the stack. Upon release of the stretch hood from the pull down device, the stretch hood is relaxed, due to inherent elasticity of the tubular film, over the top and sides of the stack, thereby tightly wrapping the stack of articles. Once fully relaxed, the stretch hood applies a holding force on the top and sides of the stack, which keeps the stack in place, for example during transport.

The stretch hood formed from the film disclosed herein is capable of being pre-stretched to a degree of elongation that is at least comparable to conventional stretch hoods formed from virgin (typically fossil-based) polymers. Typically, less than 1 out of 50 stretch hoods formed from the film will form any unacceptable defects when being pre-stretched to at least 50% elongation. Since stretch hoods are typically applied in industrial automated lines in which hundreds of units can be packaged per hour, delays caused by unacceptable packaging can cause expensive stoppages in the production line. In comparison, stretch hoods formed from tubular films with recycled material but without a polymer booster has a significant risk to tear, for holes or ruptures already at a pre-stretch of 50% elongation. Thus, the present invention provides an advantageous, sustainable film for stretch hoods that exhibits a high robustness at relatively high pre-stretching degrees.

The tubular film of the presented invention may have at least three layers. Preferably, the tubular film consists of 3 layers or 5 layers. The term "skin layer" refers to a layer forming which forms an outer side of the tubular film. The term "core layer" refers to a layer that is a positioned between the two outer skin layers. For a 5 layer configuration, the tubular film comprises two additional intermediate layers. Each intermediate layer is positioned between the core layer and one of the skin layers. The polymer films are preferably formed by blow coextrusion. The tubular film may also consist of 7, 9, 11 or 13 layers. Compared to the five layer configuration, the additional layers are made up of further intermediate layers positioned between the core layer and the skin layers.

Herein, the term recycled polyethylene refers to a polyethylene material that has previously been incorporated into one or more polymer products, or at least into one or more processes for producing a polymer product. The polymer product need not have reached the consumer market but could also include scrap material from the production of various polymer products. The "recycled polyethylene" is a polymer material comprising a high degree of recycled polyethylene material. Preferably, the recycled polyethylene comprises at least 80 wt. % of polyethylene, such as at least 90 wt. % of polyethylene. In addition to polyethylene polymer, the recycled polyethylene referred to herein may additional comprise small amount of other polymer or copolymers as well as various additives and/or contaminations. The recycled polyethylene may preferably be void of ethylene vinyl alcohol (EVOH), polyamide (PA) and/or polyethylene terephthalate (PET).

The recycled polyethylene may be provided as granules. Regranulation is typically performed by a process where the film waste is sized into small fragments and fed into a single-screw extruder, melted and filtered, and subsequently regranulated by extrusion into strands which are cut by a rotating knife under water and further cooled and dried to solid polymer granules. Most contaminants from the film waste will also be present in this recycled material. In the regranulation process, additives like antioxidants may be added, as well as virgin polyethylene, to form a regranulated material. Preferably, the recycled polyethylene should be provided from well-defined sources. The recycled polyethylene may preferably contain only small amounts of contaminations, such as less than 10% by weight of the recycled polyethylene, preferably less than 5% by weight of the recycled polyethylene.

In practice, recycled polyethylene is typically comprised from mixed sources of waste film, which also contains varying amounts of dust, soil, paper or other contaminants. The waste film may be in smaller or larger pieces, or from rolls of varying lengths. The recycled polyethylene is typically recycled in households, or by industrial sources.

The recycled polyethylene film waste should be sorted and optionally washed prior to regranulation.

The recycled polyethylene material should preferably have a high elasticity.

The present invention advantageously allows for a high degree of recycled material to be used in the tubular film.

Herein, the term "polymer booster" refers to a polymer material being a polymer elastomer or a polymer plastomer. The inventors have surprisingly realized, that by adding an amount of polymer booster in the range of 10-35 wt. % to the core layer, a polymer film which combines a high degree of recycled material (30-80 wt. %) and a high robustness during pre-stretch degrees of at least 50% elongation, can be achieved. The polymer booster may be selected from a thermoplastic elastomer and a polyolefin plastomer. Thermoplastic elastomers include e.g. polyolefin elastomers and styrenic copolymers, such as styrenic block copolymers and styrene-ethylene-butene-styrene (SEBS). The styrenic block copolymer may be styrene-butadiene block copolymer (SBS).

The term "booster" is used in the present disclosure to distinguish the "booster polymer" from other polymers disclosed herein. The term is selected since the inventors have shown that the addition of a booster polymer as defined above boosts the mechanical properties of the film, as compared to films without said booster polymer.

The terms "elastomer" and "plastomer" are known to a person skilled in the art and can be defined as follows. An "elastomer" is a polymer with viscoelasticity that has very weak intermolecular forces. It is therefore considered "rubber-like". A "plastomer" is a polymer that combines the rubber-like properties of an elastomer with the processability of a plastic. A thermoplastic elastomer is defined by IUPAC as an elastomer comprising a thermoreversible network.

The polymer booster of the present invention is a polymer elastomer or polymer plastomer. Polymer elastomers (POE) and polymer plastomers (POP) are preferably a thermoplastic elastomer and a polyolefin plastomer, respectively, such as an ethylene or propylene based polymer, such as ethylene or propylene copolymer, preferably an ethylene or propylene based copolymer having an ethylene or propylene content of at least 50%, such as of at least 60%, preferably of at least 80%. The POP and/or POE may also be selected from a styrenic copolymer, such as styrene-butadiene block copolymer (SBS) or styrene-ethylene-butadiene-styrene (SEBS).

Polyolefin elastomers may preferably have a density of less than 0.900 g/cm 3.

Furthermore, the polymer booster may be at least partly amorphous, such as primarily amorphous. The polymer booster may have a degree of crystallinity of less than 50%, such as less than 30%.

Herein, the terms "virgin ethylene polymer" and "virgin ethylene based copolymer" refers to polymers and copolymers, respectively, made from materials manufactured directly from nature in their raw form. The materials have never been used, developed, or processed before being processed to the polymer film. The source for the virgin ethylene polymer and the virgin ethylene based copolymer are typically fossil sources. The core layer of the tubular film disclosed herein may be void of virgin ethylene polymers and/or virgin ethylene based copolymer. It may also comprise up to 40 wt. % of virgin ethylene polymers and/or virgin ethylene based copolymer.

The tubular film may further comprise various additives known to a person skilled in the art, preferably in an amount of less than 5%, by weight of the tubular film. Examples of additives include pigments and UV-stabilizers.

In some embodiments, the recycled polyethylene is post-consumer recycled (PCR) polyethylene, post-industrial recycled (PIR) polyethylene, and/or internal production-waste recycled material (IPR).

In the polymer film industry, recycled polyethylene is divided into various categories depending on the source of the recycled material.

"Post-consumer recycled (PCR)" material refers to a polyethylene material that has been has been previously incorporated into one or more consumer products, used by a consumer and then collected and processed in a recycling process by the original manufacturer or one or more other entities to produce a PCR.

In the industry, PCR materials are divided into several fractions. Advantageously, the PCR of the present invention is provided from the "supermarket fraction". The "supermarket fraction" refers to PCR material being comprised of film, preferably clear film, that has been used as a packaging material for pallets, such as film from used shrink films, film from used stretch wrap and film from used stretch hoods. The "supermarket fraction" is typically collected at super markets, logistics centers, industrial factories, or other locations which receives palletized goods.

The polymer composition of PCR can vary. For the supermarket fraction, which mainly comprises shrink film, stretch wrap and stretch hoods, the polymer composition is typically rich in polyethylene. Shrink film is typically rich in LDPE with minor amounts of LLDPE and HDPE. Stretch wrap is typically rich in VLDPE and mLLDPE; and stretch hoods rich in materials such as EVA and mLLDPE. In the prior art, PCR has been found to be a particularly difficult fraction to recycle due to the inherent variation in composition and thus product properties. However, PCR is the most available fraction of recycled polyethylene on the market today. The inventors have surprisingly found that the polymer booster of the present invention allows for a tubular film with a high amount (30-80 wt.-%) of recycled polyethylene, without compromising the mechanical properties of the film. Such a tubular film can readily be used in stretch hood applications.

Another type of PCR are rPE compounds or hybrid polyethylene compounds, where Post-Consumer Waste are compounded together with a virgin Polyethylene in the regranulation process, to e.g. a compound containing 40% virgin PE and 60% PCR. One example is Ineos rLL9210 with 60% PCR (LLDPE rich—minimum 85% LLDPE). Another is Dow XZ 89169.00 with 70% PCR and 30% virgin PE (LDPE rich). This PCR part of these compounds are also understood as PCR in the following, whereas the virgin part counts as virgin PE.

"Post-industrial recycled (PIR)" material refers to plastic waste recovered from industrial processes and consists of recycled polyethylene (or blends comprising recycled polyethylene) stemming from industrial waste. In contrast to PCR, PIR is recycled plastic that has not been used for the intended purpose. The industrial processes are not limited to processes for making films intended for stretch hoods. The material typically originates from production waste like edge trims, product changeovers, products scrapped due to quality defects, rolls ends, cut-offs, i.e. design waste e.g. cutting sections for carrier bag making with handles. For the tubular film of the present invention, waste based on flexible polyethylene types like VLDPE, LDPE, EVA are be preferred. In practice however, available fractions will contain several subtypes of PE material.

"Internal production-waste recycled (IPR)" material refers to plastic waste recovered from earlier production of tubular films for stretch hoods, or similar products. In many cases, the IPR may be directly recycled in the process it originates from. Superfluous material and product changeovers may be collected and fed back as starting material for the process. The IPR may have been used internally by the manufacturer, albeit not necessary for the production of films for stretch hoods. IPR is typically a more well-defined fraction of film waste. With good internal organization, it is possible to maximize the content of useful, flexible types of polyethylene. Also, all types should preferably be transparent and without contaminants.

IPR from stretch hood production may be well defined; but it still comprises a mixture of polyethylene materials, typically a mixture of EVA and mLLDPE.

The three categories mentioned above have all proven to be advantageous sources of recycled polyethylene.

In some embodiments, the virgin ethylene polymer and virgin ethylene based copolymer are selected from the group consisting of low density polyethylene (LDPE), very low density polyethylene, linear low density polyethylene, high density polyethylene, styrene butadiene copolymer, ethylene-vinyl acetate copolymers (EVA), and ethylene butyl acrylate copolymers (EBA).

Suitable ethylene polymers are homopolymers of ethylene and are essentially linear in structure. As used herein, the term "saturated" refers to polymers which are fully saturated, but also includes polymers containing up to about 5 percent unsaturation. The homopolymers of ethylene include those prepared under either low pressure, i.e., linear low density or high density polyethylene, or high pressure, i.e., branched or low density polyethylene.

Low density polyethylene has a density of less than 0.94 g/cm$^3$ and are usually in the range of 0.910 g/cm$^3$ to about 0.930 g/cm$^3$. Very low density polyethylene can be used in accordance with the present disclosure. Generally, very low density polyethylene (vLDPE) has a density of less than 0.91 g/cm$^3$.

Linear low density polyethylene typically has a density in the range of 0.910 to about 0.935 g/cm$^3$.

The high density polyethylenes are generally characterized by a density that is at least 0.94 grams per cm$^3$ (g/cm$^3$). Generally, the high density polyethylenes useful as the virgin ethylene based present disclosure have a density ranging from about 0.94 g/cm³ to about 0.97 g/cm³.

The virgin ethylene based copolymer may include copolymers of ethylene such as ethylene-vinyl acetate copolymers (EVA), and ethylene butyl acrylate copolymers (EBA). Preferably, the core layer comprises 0-40%, by weight, of virgin EVA or EBA.

In some embodiments, the core layer comprises, by weight of the core layer:

50-80% of recycled polyethylene;

10-35% of a booster polymer selected from a thermoplastic elastomer or a polyolefin plastomer;

0-25% of virgin ethylene-vinyl acetate copolymers (EVA) and/or virgin ethylene butyl acrylate copolymers (EBA).

Preferably, the core layer comprises a majority portion, by weight, of recycled polyethylene, such as in the range of 50-80%, preferably in the range of 55-80%, more preferably in the range 60-75%. A high amount of recycled polyethylene reduces the amount of carbon dioxide emissions associated with the film, as calculated by Life Cycle Assessment (LCA) according to e.g. ISO 14024. Thus, the inventive tubular film can reduce the environmental burden associated with prior art stretch hood solutions The inventors have found that an amount of booster polymer in the range of 10-35%, such as in the range of 12.5-32.5% allows for a high amount of recycled polyethylene in the core layer, without compromising the stretchability of the tubular film.

In order to reduce the carbon emissions associated with the film as much as possible, a low amount of virgin polymer should be used. The inventors have developed a film containing no more than 25%, such as no more than 20% of virgin ethylene-vinyl acetate copolymers (EVA) and/or virgin ethylene butyl acrylate copolymers.

In some embodiments, the recycled polyethylene comprises, by weight of the recycled polyethylene, 50-70% of PCR and 30-50% of PIR and/or IPR. Preferably, the majority of the recycled polyethylene is PCR. With end user's increasing awareness of recycling the obtainable amount of PCR in the industry in total is likely to increase each year. Preferably, the recycled polyethylene comprises, by weight of the recycled polyethylene, 60-70% of PCR and 30-40% of PIR and/or IPR.

Alternatively, the recycled polyethylene may comprise, by weight of the recycled polyethylene, 35-45% of PCR and 55-65% of PIR and/or IPR.

The recycled polyethylene may also comprise, by weight of the recycled polyethylene, at least 90% of PCR and 10% or less of PIR and/or IPR.

In some embodiments, the at least one skin layer comprises linear low density polyethylene (LLDPE), such as metallocene-based linear low density polyethylene (mLLDPE), and optionally further comprises low density polyethylene (LDPE). Preferably, the at least one skin layer comprises hexene based mLLDPE. The outer skin layer should preferably have a good weldability such that a stretch hood can be formed from the tubular film. The at least one skin layer will generally further comprise additives. Examples of such additives include silica, talc or chalk for use as antiblok agents and erucamide for use as slip agent. The at least one skin layer may have a melt flow rate (MFR) of about 1.0 g/10 min, measured at 190° C. and 2.16 kg load, as measure measured by ISO standard 1133-1. The skin layer preferably has a density in the range of 0.912 to 0.920 g/cm³, such as of about 0.918 g/cm³.

In some embodiments, wherein the tubular film has a first skin layer and second skin layer arranged on opposing sides of the core layer. A three layer configuration as described above can be obtained by blown film coextrusion using three extruders and a multi-manifold circular die head.

In some embodiments, the tubular film further comprises a first intermediate layer arranged between the first skin layer and the core layer, and a second intermediate layer provided between the second skin layer and the core layer. A five layer configuration as described above can be obtained by blown coextrusion five extruders and a multi-manifold circular die head. The intermediate layers may have the same composition as the core layer. The intermediate layers may alternatively have the same composition as at least one of the skin layers. Alternatively, the first and second skin layer may have different compositions.

In some embodiments, the weight of the core layer is at least 50% of the weight of the tubular film. The skin layer(s) typically has a lower flexibility than the core layer. Therefore, the weight of the core layer may preferably correspond to at least half of the total weight of the film. In some examples of a three layer film configuration, the ratio, by weight, of skin layer:core layer:skin layer is in the range of 12.5-25:50-75:12.5-25.

In some embodiments, at least one skin layer comprises, by weight of the skin layer, 10-25% of recycled polyethylene; and 75-90% of virgin polyethylene.

By substituting a portion of the virgin polyethylene normally used to manufacture the skin layers for a portion of recycled polyethylene, an even more sustainable product can be obtained. The recycled polyethylene may be the recycled polyethylene as described above in relation to the components of the core layer. Alternatively, at least one skin layer may comprise, by weight of the skin layer, 10-35% of recycled polyethylene; and 65-90% of virgin polyethylene.

In some embodiments, the thermoplastic elastomer is a polyolefin elastomer or a styrenic copolymer. Styrenic copolymers include styrene block copolymers, such as styrene-butadiene block copolymers (SBS) and styrene-ethylene-butene-styrene copolymers (SEBS).

In some embodiments, the booster polymer thermoplastic elastomer or polyolefin plastomer selected from a styrenic copolymer, or a copolymer comprising ethylene and/or propylene and a comonomer selected from the group consisting of octene, hexene, styrene, butene, ethylene and propylene. Preferably, the booster polymer is a copolymer comprising propylene and ethylene comonomer. The inventors have surprisingly realised that a thermoplastic elastomer or polyolefin plastomer being a styrenic copolymer or a copolymer comprising ethylene and/or propylene and additionally a comonomer selected from the group consisting of octene, hexene, styrene, butene, ethylene and propylene can be utilized in a film comprising a high amount of recycled polyethylene. Thus, a film with a high stretch ability that can be utilized as a stretch hood capable of being pre-stretched to at least 50% elongation can be obtained. Such a stretch hood provides a high robustness, meaning that it is unlikely to tear or otherwise form unacceptable defects when pre-stretched to at least 50% elongation. For example, less than 1 out of 50 of such stretch hoods have shown to form tears or defects when being pre-stretched to at least 50% elongation.

The styrenic copolymer may be selected from styrenic block copolymers and styrene-ethylene-butene-styrene (SEBS). The styrenic block copolymer may be styrene-butadiene block copolymer (SBS)

The copolymer comprising ethylene and/or propylene and a comonomer selected from the group consisting of octene, hexene, styrene, butene ethylene, and propylene may have an ethylene or propylene content of at least 50%, such as of at least 60%, preferably of at least 80%.

The polymer booster may have a density of less than 0.900 g/cm³.

Furthermore, the polymer booster may be at least partly amorphous, such as mainly amorphous. The polymer booster may have a degree of crystallinity of less than 50%, such as of less than 30%.

In some embodiments, the tubular film has an Elmendorf tear strength in the machine direction of manufacturing in the range of 8-12 cN/μm, as measured according to ISO 6383/2:2004. Preferably, the tubular film has an Elmendorf tear strength in the machine direction of manufacturing in the range of 9-11 cN/μm, as measured according to ISO 6383/2:2004. The Elmendorf tear strength is a property that represent the ability of the film to withstand tear or rupture. For comparison, virgin based stretch hood may have an Elmendorf tear strength in the machine direction of manufacturing of to 15 cN/μm.

In some embodiments, the tubular film has a has a crack propagation resistance as defined by a notch tear strength of at least 23 N/20 mm, such as in the range of 25-30 N/20 mm as measured according to the test standard described below. The tubular film may have an elongation at break of at least 50%, such as at least 60%, preferably in the range of 70 to 85%, according to the test method standard described below.

The notch tear strength is a property of the tubular film that may be measured according to an adapted internal test method. The notch tear strength is a property that represent the ability of the film to withstand the propagation of crack once a crack has formed in the film. The higher values, the better is the crack resistance. The stretch hood of the present invention preferably exhibits a high crack propagation resistance. This is measured by placing a film strip of approximately 20 mm width and length (L) with 100 mm distance between holders in a tensile testing machine well known in the art. A 5 mm triangle shaped notch is then made in the film. At a tensile draw speed of 500 mm/min the film exhibits a crack propagation resistance of 25 to 30 N/20 mm and elongation at break of approximately 70 to 85%. For comparison, virgin material based films typically has a notch tear strength which is slightly lower, with an elongation which is typically higher. Prior art films of recycled material typically has a notch tear strength of less than 25 N/20 mm, such as less than 22 N/20 mm.

Stretch hoods formed from the tubular film typically exhibits satisfying elastic recovery and a good holding force. Elastic recovery and holding force in the present disclosure is measured in accordance with an "elastic recovery and holding force test method". The elastic recovery and holding force test method in the present disclosure is defined as follows: A film strip of approximately 20 mm width and length (L) is placed with 100 mm distance between holders in a tensile testing machine well known in the art. The tensile testing method is of the type defined in the International standard ISO 527-3. The machine stretches the film at a rate of 500 mm/min until the film reaches a predetermined first length (L1), typically to a length in the range of 160-220% of the original length L depending on the film material. The film is kept at the first length (L1) for 15 seconds. The elongation is then reduced 20% to a second length (L2) and kept there for an additional 240 seconds, to allow contraction. L2 represents the residual elongation of the hood after mounting on the stack of articles. The load on the sample is then measured and converted to a corresponding force. This force is the holding force [N/20 mm] of the sample. The sample is then released from the holders and after the film has completely relaxed a third length (L3) is measured. The elastic recovery may be defined by the following equation $$L_1 - L_3/L \times 100 \ [\%].$$

At an initial prestretch L1 of 180 mm (80% pre-stretch) and L2 of 160 mm (60% residual elongation), the stretch hoods formed of the tubular film disclosed herein typically exhibits a L3 is in the range of 120 to 130 mm, such as 124 to 127 mm (24 to 27% elongation). For comparison, other film containing recycled material but no booster polymer typically has a higher value, an L3 in the range of 129 to 135 mm (29 to 35% elongation). Virgin stretch hoods exhibits lower L3, typically in the range of 120 to 125 mm (20 to 25% elongation). The lower this value, the higher elasticity of the hood, and the better will the holding of the stack of articles be.

The objects of the invention are also accomplished by a blow extrusion method for forming a tubular film intended for a stretch hood, the tubular film having a core layer and a first skin layer and a second skin layer, the skin layers being provided on opposite sides of the core layer, the method comprising forming a mixture by providing recycled polyethylene; a polymer booster selected from a thermoplastic elastomer or a polyolefin plastomer, and a virgin ethylene polymer and/or virgin ethylene based copolymer to a first extruder arranged to provide material to the core layer;

providing polyethylene to a second and third extruder arranged to provide material to the skin layers;

melt processing the mixture and the polyethylene provided to the extruders; and blow extruding the melt processed mixture and polyethylene through an annular die head to form a tubular film intended for a stretch hood.

Blow extrusion is an advantageous method for forming multi-layer tubular films. Extruders for blow extrusion are known to a person skilled in the art. The virgin ethylene polymer and/or virgin ethylene based copolymer may be provided to the extruder in the shape of granules. The booster polymer may be provided to the extruder in the shape of granules. The recycled polyethylene may preferably be PCR, PIR and/or IPR. Preferably, the recycled polyethylene may be re-melted and provided in the shape of granules.

The above-described method may advantageously be used for producing the above-described tubular films.

For a film comprising a core layer and two outer skin layers, the mixture in the first extruder will form the core layer. The polyethylene in the second and third feed extruders will form the skin layers.

In some embodiments, the tubular film further comprises a first intermediate layer arranged between the first skin layer and the core layer, and a second intermediate layer provided between the second skin layer and the core layer, the method comprising providing polyethylene to a fourth and fifth extruder being arranged to provide material to the intermediate layers. Polyethylene provided to the fourth and fifth feed sections will form the intermediate layers in the tubular film.

In some examples, the method may further comprise providing polyethylene to yet further extruders, such as to a sixth and seventh extruders.

In some embodiments, the blow extrusion method further comprises a step of gusseting the tubular film to form a gusseted tubular film.

The step of gusseting is performed to form a gusseted tubular film. A gusseted film can readily be employed by a pull down device at an end user's in a process of enclosing a stack of articles with a stretch hood formed from the gusseted tubular film. Means for gusseting a tubular film are known to a person skilled in the art.

In some embodiment, the mixture comprises, by weight of the mixture:

30-80% of recycled polyethylene;

10-35% of a booster polymer selected from a thermoplastic elastomer or a polyolefin plastomer; and 0-40% of virgin ethylene polymer and/or virgin ethylene based copolymer.

The inventors have found that by providing a mixture comprising recycled polyethylene, booster polymer and optionally a virgin ethylene polymer and/or virgin ethylene based copolymer to an extruder, a film having a core layer that exhibits high stretchability despite a high amount of recycled material in the core layer.

The objects of the invention are also accomplished by a method for enclosing a stack of articles arranged on a pallet, said method comprising:

applying a tubular film as disclosed herein such that a stretch hood of the tubular film encloses the top and sides of the stack.

Preferably, the method is performed using a stretch hood machine. Such machines are known to a person skilled in the art.

The pallet may for example be a standard Euro-pallet of 120×80 cm, an industrial pallet of 100×120 cm, a "semi-pallet" of 60×80 cm or a quarter pallet of 60×40 cm in size. The pallet may also be of other dimensions known in the art. The stack of articles is preferably dimensioned to fit the pallet.

In some embodiments, the applying of the tubular film further comprises feeding a stretch hood from a roll of tubular film to a pull-down device, pre-stretching the stretch hood to 50-90% elongation, pulling the stretch hood with the pull-down device down over the top and sides of the stack, releasing the stretch hood from the pull-down device, thereby relaxing the stretch hood over the top and sides of the stack.

Advantageously, the inventors have found that by using the above-described film in a method for enclosing a stack or articles, said film can be pre-stretched to 50-90% elongation without forming tears, holes or other unacceptable defects. In examples, no more than 2 out of 100 inventive stretch hoods form tears, holes or other unacceptable defects upon being pre-stretched to 50-90% elongation. This is advantageous in that it provides a robust method having low risk of causing interruptions in the production line.

In some embodiments, feeding the stretch hood comprises welding the opposing sides of the tubular gusseted film to each other; and cutting the tubular film to form a stretch hood.

The polymer film is typically provided on a roll of tubular film, preferably gusseted tubular film. When forming a stretch hood from the tubular film, the tubular film is top welded and cut just before mounting of the stretch hood on the stack of articles. When welded, the stretch hood has a top portion and four side walls. The welding is preferably performed just before the cutting. It can also be contemplated that the cutting is performed before the welding.

Stretch hood machines used in the industry are capable of welding and cutting tubular films to form stretch hoods.

It is noted that the invention relates to all possible combinations of features recited in the claims.

The above described and other features are exemplified by the following figures and detailed description.

BRIEF DESCRIPTION OF APPENDED DRAWINGS

Figure 2:
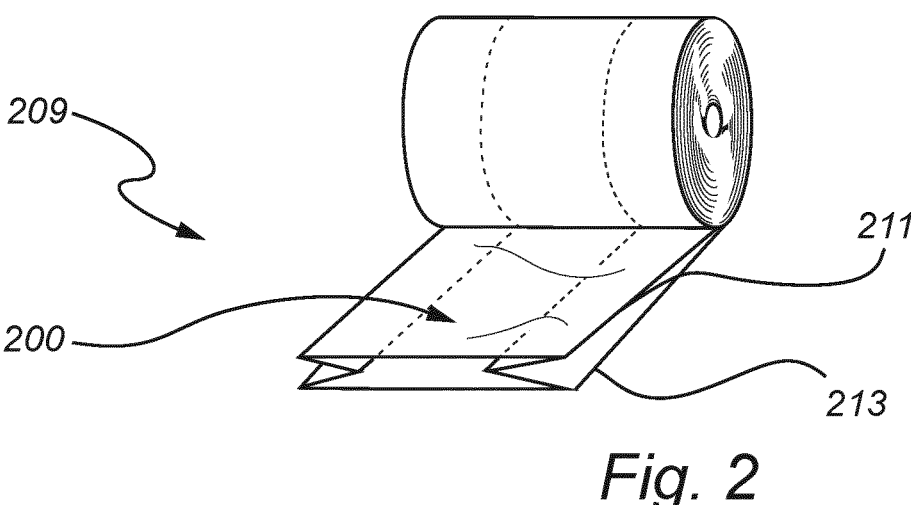

The invention will hereinafter be described in detail by reference to exemplary embodiments as illustrated in the following drawings, in which:

FIG. 1 shows a stack of articles enclosed with a stretch hood formed of the tubular film according to the invention FIG. 2 shows a roll of gusseted tubular film according to the invention.

FIGS. 3 *a-b* show, respectively, a cross-section of a three-layer film and a five-layer film according to the invention.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. As illustrated in the figures, the sizes of layers and regions may be exaggerated for illustrative purposes and, thus, are provided to illustrate the general structures of embodiments of the present invention.

FIG. 1 shows a stack of articles 102 arranged on a pallet 103, enclosed by a stretch hood 110 formed from the inventive tubular film 100. Articles are generally stacked in layers 107, 109 on the pallet 103 to allow for space efficient transports. In order to keep the articles in place on the pallet 103, the stretch hood 110 encloses the top and sides of the stack 102, as well as a portion of the pallet 103. In the figure, the articles are illustrated as being cardboard boxes, but they could also be any other type of package transported on pallets. Since large numbers of articles are transported in this manner every day, there is a vast use of stretch hoods and other packaging solutions in the industry today causing a significant carbon footprint. The tubular film of the present invention allows for a reduction in the carbon footprint associated with the film, without compromising the properties that make the film suitable as stretch hood material, such as tear strength, crack propagation resistance, elastic recovery, and holding force.

FIG. 2 shows a roll 209 of a gusseted tubular film 200 according to the invention. The gusseted tubular film 200 comprises two pleats 211, 213 on each side of the film, which allows for a tubular film having a larger circumference as compared to a roll of un-gusseted film.

When a roll 209 of gusseted tubular film 200 as shown in FIG. 2 is applied to a stack of articles 102 as shown in FIG. 1, the stretch hood is applied to the stack of articles 102 by feeding an appropriate length of a tube of polymer film 200 from the roll 209 onto a pull-down device. The circumference of the tube is lower than the horizontal circumference of the stack of articles 102. The pull-down device arranges the tube in a shape corresponding to the geometry of the horizontal cross section of the stack. The tube is cut off from the film roll and the cut-off end is joined together by plastic welding forming a top weld 111, thus forming the closed top of the stretch hood. The welding is performed by means well known in the art, for example by electrical induction heated bars. The pulldown device stretches the circumference of the stretch hood to a predetermined pre-stretch degree, typically in the range of 50-90%, such as 60-80%, such that the stretch hood in the stretched state has a circumference which is greater than the horizontal circumference of the stack of articles 102. The stretch hood is then pulled over the top and sides of the stack of articles 102 and, the stretch hood 110 is gradually released from the pull-down device. The stretch hood 110 will then retract until it encloses the top and sides of the stack of articles 102. The retraction process typically takes a few seconds. After retraction, the stretch hood typically has a residual elongation in the range of 15-30%, such as 20-25%, for example about 22%. The residual elongation is typically caused by both an elastic and a plastic deformation component. Preferably, the plastic deformation component is substantially small, however in practise the elastic recovery of stiff stretch hoods is typically only partial, for example about ¾ of the original deformation. The elastic component of the residual elongation allows the stretch hood to exert a holding force to the top and sides of the stack of articles 102.

Figure 3A:
Figure 3B:
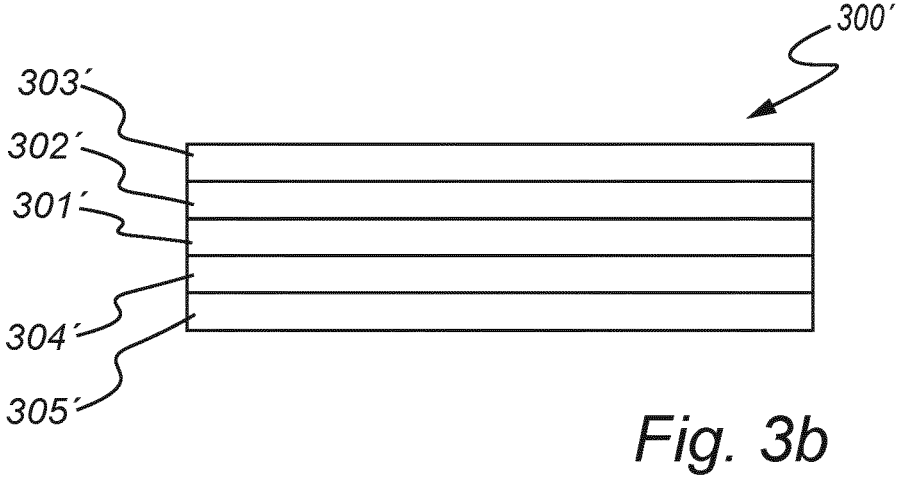

FIGS. 3a and 3b shows a cross section of a side of the tubular film. The cross-sections display the multi-layer configuration of the film. In FIG. 3a, a three layer tubular film 300 having a core layer 301, a first skin layer 303 and a second skin layer 305 is shown. The core layer comprises recycled polyethylene, a booster polymer being selected from booster polymer selected from a thermoplastic elastomer and a polyolefin plastomer, and a virgin ethylene polymer and/or virgin ethylene based copolymer. The skin layers comprise a polyethylene, such as a hexene based mLLDPE. The proportions, by weight of skin layer:core layer:skin layer is preferably 12.5-25:50-75:12.5-25.

In FIG. 3b, a five layer configuration tubular film 300' having a core layer 301', a first skin layer 303' and a second skin layer 305' is shown. Between the core layer 301' and the first skin layer 303' a first intermediate layer 302' is arranged. Between the core layer 301' and the second skin layer 305' a second intermediate layer 304' is arranged. The core layer and the skin layer are composed as described above in relation to FIG. 3a. The intermediate layers may have the same composition as the skin layers. Alternatively, the intermediate layers have the same composition as the core layer.

While the invention has been described with reference to various exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

EXAMPLES

The invention will in the following be described with reference to the following examples.

Film Composition

A three-layer tubular film (Film 1A) having a total thickness of 100 µm was obtained using blown coextrusion. The film was gusseted and provided on a roll. The width of the film was 1000 mm×500 mm. The film had a layer distribution in which a core layer had a thickness of 72 µm. Two skin layers were provided on opposite sides of the core layer, each having a thickness of 14 µm. The core layer comprised a mixture, by weight of the core layer, of 10% EVA grade ExxonMobil UL00119, which is an ethylene copolymer with 19% vinylacetate comonomer, as a source of virgin material, 20% of polyolefin elastomer (POE) grade Vistamax 6102 (from ExxonMobil), which is a propylene based copolymer with an ethylene comonomer, 45% of PCR polyethylene (washed PCR from a "Supermarket Fraction" rich in stretch wrap film and shrink film. The PCR was translucent and had a melt flow rate of approximately 0.5), 25% of IPR from internal stretch hood production waste (recycled from stretch hoods with a typical average of 60% EVA and 40% C6-mLLDPE, translucent). The total amount of recycled material in Film 1A was thus about 50%, by weight.

The skin layers contained a C6-mLLDPE, Lumicene M1811PCE from Total, and small amounts of natural silica based antiblock masterbatch. The skin layers of the Film 1A was made of virgin polyethylene in this example.

The film was blow coextruded normal on a blown film coextrusion line, dedicated for production of stretch hood products, in a die having a diameter of 300 mm and an output of 250 kg/hour. The temperature settings was selected as would normally be applied for EVA in the core layer. The process was running in a stable manner without any large fluctuations of temperature, pressure or bubble positioning. The thickness profile was normal for a stretch hood product. The visual appearance of the blown film was typical for a film with recycled material, i.e. with a slight smoke-colour tint, small gels of defects of up to 0.5 mm size, and occasionally a few larger fish eye like defects.

In a similar manner a three-layer tubular film (Film 1B) was produced. Film 1B differed from Film 1A in that the POE in the core layer was substituted with EVA grade ExxonMobil UL00119. The total amount of recycled material in Film 1B was thus about 50%, by weight.

A three-layer tubular film (Film 2A) was produced, in a similar manner as Film 1A. Film 2A differed from film 1A in that the core layer consisted of a mixture, by weight of the core layer, of 70% of the same type of PCR polyethylene used in Film 1A and 30% of POE (Vistamax 6102 (from ExxonMobil).

In a similar manner a three-layer tubular film (Film 2B) was produced. Film 2B differed from film 2A in that the core POE was substituted by an EVA with 7.5% vinyl acetate comonomer and melt index 0.7—type Nexxstar 0111 from ExxonMobil.

Film 3A differed from film 2A in that the two skin layers comprised a mixture, by weight of the skin layer, of 20% of the same PCR poylethylene as above, and at least 75% of a C6-mLLDPE, Lumicene M1811PCE from Total, and small amounts of natural silica based antiblock masterbatch.

Film 4A was produced, in a similar manner as film 1A, as a five-layer tubular film (Film 4A) having a total thickness of 100 um, with two skin layers of each 10 um and essentially the same composition as film 1A, with the difference that the mLLDPE component being a mixture of metallocene LLDPE Lumicene M1810PCE and metallocene LLDPE Lumicene M1810EP, to adjust the coefficient of friction of the film. The three layers arranged between the skin layers all have the same composition: 40% of the PCR polyethylene used in example 1A, 40% of another PCR polyethylene (also a washed composition rich in stretch wrap film), and 20% of polyolefin elastomer (POE) grade Vistamaxx 6102. The total amount of recycled material in film 4A was thus about 64% by weight.

Stretch Hood Experiments

Film 1A and 1B

Film 1A was applied as a stretch hood to a Europallet size pallet of box-shaped dimensions 120 cm width×80 cm depth and 131 cm height, using a Lachenmeier stretch hood machine. Pre-stretching of 55% and 69% relatively was applied. At mounting, the hood contracted very fast, within one second. The hood was building up a high holding force on the articles inside. After mounting, the residual stretching is 33%. Surprisingly, the hoods could be mounted in a total acceptable manner, without any cracks, holes, tears or other substantial defects. Only a few white stress lines could be observed. There were no cracks around the gel-like defects. In regions with highest stress, i.e. in top corner regions, some fine delamination lines occurred; where the core layer has fractured in lines of approximately 4×30 mm, but without causing holes in the hood. Also, a pre-stretching of 82% could be done on the same pallet, with much longer contraction time, but still without any holes, cracks or tears. Contraction was slow, but still complete on hoods that did not crack. However, holding force was significantly reduced. There were no machine safety stops or cracks formed in the film during subsequent application of five hoods (on each parameter set).

A robustness test of Film 1A was also performed, in which 50 hoods was applied to pallets in the manner described above, with 55% pre-stretch, in sections of 10 with a few minutes' intervals (to inspect and remove the hoods) over a period of less than 60 minutes, and on an automatic mode of the stretch hood machine. Only one defect that caused a stop was observed. The defect was in a corner position of the stretch hood, but without any rupture of the hood. By overriding the machine's safety stop, this hood could be mounted.

In a comparative test, the Film 1B was tested in an identical manner. When pre-stretched to 55%, it performed acceptable for some hoods, with no major defects and good contraction. However, in a robustness test of film 1B; 24 of 50 hoods formed one or two holes of 10 to 25 cm size at the upper corner regions. No ruptures along the entire length of the hood was observed. The defective hoods always resulted in a stop of the stretch hood machine. By overriding the machine's safety stop, most of these hoods could be mounted. However, such defective hoods are not waterproof and concerns can be raised with regard to their load stability.

Film 2A and 2B

Film 2A was applied as a stretch hood to a Europallet size pallet of box-shaped dimensions 120 cm width×80 cm depth and 131 cm height, using a Lachenmeier stretch hood machine. Pre-stretching of 55% was applied. At mounting, the hood contracted very fast, within one second. The hood built up a high holding force on the articles inside. After mounting, the residual stretching was 33%. Surprisingly, the hoods could be mounted in a totally acceptable manner, without any cracks, holes, or tears. No substantial defects were observed. Only a few white stress lines could be observed. There were no cracks around the gel-like defects.

A robustness test was also performed, in which 50 hoods were applied to pallets as described above, in section of ten with a few minutes' interval, over a period or less than 45 minutes. Only one of the 50 hoods formed a small hole in a single corner region of 10-15 cm size, but no crack or rupture through the entire hood. The defective hood yielded a safety stop, that could be overridden to mount the hood.

Film 2B was tested in an identical manner. It could not be pre-stretched at 55% in a satisfying manner; all 50 of 50 hoods tested were forming one or more holes and most of them cracked by rupture along the entire height of the articles. In all 50 cases, a safety stop was caused in the stretch hood machine.

Film 3A

Film 3A was tested in a similar manner as Film 1A, with prestrecthing to 55 and 69%, respectively. Surprisingly, the hoods could be mounted in a totally acceptable manner, without any cracks, holes, tears or other substantial defects. Only a few white stress lines could be observed. There were no cracks around the gel-like defects. In regions with highest stress, i.e. in top corner regions, some fine delamination lines occurred. No robustness test was performed for this film.

Film 4A

Film 4A was tested in a similar manner as Film 1A, with prestrecthing to 55 and 69%, respectively. Surprisingly, the hoods could be mounted in a totally acceptable manner, without any cracks, holes, tears or other substantial defects. Only a few white stress lines could be observed. There were no cracks around the gel-like defects. In regions with highest stress, i.e. in top corner regions, some fine delamination lines occurred. No robustness test was performed for this film.

The invention claimed is:

1. A tubular film adapted to form a stretch hood, the tubular film having a core layer and at least one skin layer, wherein the core layer consists of, by weight of the core layer:

30-80% or recycled polyethylene, wherein the recycled polyethylene has a density of less than 0.930 g/cm$^3$;

10-35% of a polymer booster that is a thermoplastic elastomer, wherein the thermoplastic elastomer has a density of less than 0.900 g/cm$^3$;

0-40% of virgin polymer and/or virgin ethylene based copolymer, and wherein the virgin ethylene polymer and/or virgin ethylene based copolymer are selected from the group consisting of low density polyethylene (LDPE), very low density polyethylene, linear low density polyethylene, styrene butadiene copolymer, ethylene-vinyl acetate copolymers (EVA), and ethylene butyl acrylate copolymers (EBA), and the at least one skin layer has a lower flexibility than the core layer.

2. The tubular film according to claim 1, wherein the recycled polyethylene comprises post-consumer recycled (PCR) polyethylene.

3. The tubular film according to claim 1, wherein the recycled polyethylene comprises post-industrial recycled (PIR) polyethylene, and/or internal production-waste recycled polyethylene material (IPR).

4. The tubular film according to claim 1, wherein the core layer consists of, by weight of the core layer:

50-80% or a recycled polyethylene, 10-35% of a polymer booster that is a thermoplastic elastomer, and 0-25% of virgin ethylene-vinyl acetate copolymers (EVA) and/or virgin ethylene butyl acrylate copolymers (EBA).

5. The tubular film according to claim 1, wherein the recycled polyethylene comprises, by weight of the recycled polyethylene, 50-70% of PCR and 30-50% of PIR and/or IPR.

6. The tubular film according to claim 1, wherein the at least one skin layer comprises linear low density polyethylene (LLDPE), optionally including metallocene-based linear low density polyethylene (mLLDPE), and may further comprise low density polyethylene (LDPE).

7. The tubular film according to claim 1, wherein the tubular film has a first skin layer and second skin layer arranged on opposing sides of the core layer.

8. The tubular film according to claim 7, wherein the tubular film further comprises a first intermediate layer arranged between the first skin layer and the core layer, and a second intermediate layer provided between the second skin layer and the core layer.

9. The tubular film according to claim 1, wherein at least one skin layer comprises, by weight of the skin layer, 10-25% of recycled polyethylene; and 75-90% of virgin polyethylene.

10. The tubular film according to claim 1, wherein the polymer booster is selected from the group consisting of a styrenic copolymer, and a copolymer comprising ethylene and/or propylene and a comonomer selected from the group consisting of octene, hexene, styrene, butene, ethylene and propylene.

11. The tubular film according to claim 1, wherein the recycled polyethylene is selected from LDPE, LLDPE, VLDPE, and combinations thereof.

12. The tubular film according to claim 1, wherein the recycled polyethylene is selected from EVA, mLLDPE, LDPE, LLDPE, VLDPE, and combinations thereof.

13. A blow extrusion method for forming the tubular film of claim 1 intended for a stretch hood, the tubular film having a core layer and a first skin layer and a second skin layer, the skin layers being provided on opposite sides of the core layer, the method comprising forming a mixture by providing recycled polyethylene, a polymer booster that is thermoplastic elastomer, and a virgin ethylene polymer and/or virgin ethylene based copolymer to a first extruded arranged to provide material to the core layer;

providing polyethylene to a second and third extruder arranged to provide material to the skin layers;

melt processing the mixture and the polyethylene provided to the extruders; and blow extruding the melt processed mixture and polyethylene through an annular die heat to form a tubular film intended for a stretch hood.

14. The blow extrusion method according to claim 13, wherein the tubular film further comprises a first intermediate layer arranged between the first skin layer and the core layer, and a second intermediate layer provided between the second skin layer and the core layer, the method comprising providing polyethylene to a fourth and fifth extruder being arranged to provide material to the intermediate layers.

15. The method according to claim 13, wherein the mixture comprises, by weight of the mixture:

30-80% of recycled polyethylene;

10-35% of a polymer booster that is a thermoplastic elastomer; and 0-40% of virgin ethylene polymer and/or virgin ethylene based copolymer.

16. A method for enclosing a stack of articles arranged on a pallet, said method comprising:

applying a tubular film according to claim 1 such that a stretch hood of the tubular film encloses the top and sides of the stack.

* * * * *